US008668262B2

(12) United States Patent  
Kim

(10) Patent No.: US 8,668,262 B2
(45) Date of Patent: Mar. 11, 2014

(54) ANGLE ADJUSTER FOR BICYCLE SEAT

(76) Inventor: Chun Choo Kim, Seoul (KR)

( * ) Notice: Subject to any disclaimer, the term of this patent is extended or adjusted under 35 U.S.C. 154(b) by 466 days.

(21) Appl. No.: 12/881,168

(22) Filed: Sep. 13, 2010

(65) Prior Publication Data

US 2011/0127813 A1 Jun. 2, 2011

(30) Foreign Application Priority Data

Nov. 30, 2009 (KR) .................. 10-2009-0116809

(51) Int. Cl.
*B62J 1/00* (2006.01)
(52) U.S. Cl.
USPC ............... 297/215.15; 297/195.1; 297/215.14
(58) Field of Classification Search
USPC .................. 297/195.1, 215.14, 215.15, 215.1
See application file for complete search history.

(56) References Cited

U.S. PATENT DOCUMENTS 5,979,978 A * 11/1999 Olsen et al. ............... 297/215.15
7,681,899 B2 * 3/2010 Fujiwara ..................... 280/283

FOREIGN PATENT DOCUMENTS

| EP | 0542650 | 12/1992 |
| JP | 11-301542 | 11/1999 |
| KR | 10-1999-0030387 | 4/1999 |
| KR | 20-0222176 | 5/2001 |
| KR | 10-2009-0085900 | 8/2009 |
| WO | 90/06020 | 5/1991 |

* cited by examiner

*Primary Examiner* — David Dunn
*Assistant Examiner* — Erika Garrett
(74) *Attorney, Agent, or Firm* — Aliki K. Collins; AKC Patents

(57) ABSTRACT

An angle adjuster for a bicycle seat that is disposed between a frame of a vehicle and a seat. The angle adjuster for a bicycle seat includes: a frame connector configured to be connected with the frame; a seat connector configured to support the seat, rotatably connected to the upper end of the frame connector, and having a nose at bottom facing the frame connector; an angle adjusting assembly disposed between the frame connector and the seat connector, and having a plurality of locking steps where the nose is configured to be selectively engaged to control rotational angle of the seat connector; an operating lever configured to be mounted on the frame to operate the angle adjusting assembly; and a wire connecting the angle adjusting assembly with the operating lever and reciprocating the angle adjusting assembly, when the operating lever is operated.

5 Claims, 11 Drawing Sheets

ANGLE ADJUSTER FOR BICYCLE SEAT

RELATED APPLICATIONS

This application claims priority under 35 U.S.C. 119(e) from Korean Patent Application No. 10-2009-0116809, filed Nov. 30, 2009 in the Korean Intellectual Property Office, which is incorporated herein by reference in its entirety.

TECHNICAL FIELD

Embodiments of the present invention relate to an angle adjuster for a bicycle seat, in more detail, an angle adjuster for a bicycle seat that allows a user to maintain a stable position by adjusting angle and height of the seat while the bicycle travels.

DESCRIPTION OF RELATED ART

In general, a bicycle is a vehicle that a user rides by rotating the wheels of the bicycle with two legs while the user sits on the seat with the user's hands holding the handlebars. The user alternatively pushes the pedals with the user's two legs such that a wheel is rotated by a chain. Although there are usually two wheels, there may be one, three, or even more wheels. Such human-powered bicycles have been widely used as a typical means of transportation, and particularly, have been recently applied in various fields, such as sport outfits for improving health and recreation. Further, demand is increasing for the environmentally-friendly features of bicycles.

The structure of bicycles of the related art typically includes: a front wheel and a rear wheel that rotate on the ground to move the bicycle; a frame that has handlebars steering the front wheel at the front upper portion and supporting the front wheel, and the rear wheel to be rotatable; pedals that are linked with the rear wheel by a chain to rotate the rear wheel; and a seat assembly that is mounted at the rear upper portion of the frame for a user to ride.

Further, there have been bicycles equipped with a height adjuster to adjust height of thes a seat to fit the height of a user.

However, the seats were fixed perpendicularly to the frame of the bicycles in the bicycles of the related art, such that it was difficult to adjust angle of the seats to fit the user's body shape and riding position. That is, since the angle of the seat were fixed, it was difficult to satisfy all of users having various body shapes. Further, the user's position inclines forward or backward from the bicycles, when the user goes up or comes down a slope with the bicycles, in which since the angle of the seats is fixed, the user has difficulty in maintaining a comfortable position, thereby increasing the chance of an accident.

Therefore, the applicant(s) has made an application of an angle adjuster for a bicycle seat in order to overcome the problems, which is disclosed in Korean Patent Publication No. 2009-0085900, titled "Angle adjusting device for bicycle saddle". However, according to the related art, users have to directly operate a hinge unit of an angle adjuster under the seat to adjust angle of the seat, such that it was difficult to adjust the angle of the seat while the bicycles run.

SUMMARY

Embodiments of the present invention address the problems of the related art and it is an aspect of the present invention to provide an angle adjuster for a bicycle seat that allows users to ride a bicycle in a stable position by adjusting angle of the seat to fit the body shapes of various users, and to easily correct the position by adjusting the angle of the seat in accordance with the riding conditions of the user, by using an operating lever even though the bicycles is in motion.

Further, it is another aspect of the present invention to provide an angle adjuster for a bicycle seat that makes it possible to adjust the height of the seat in accordance with riding conditions of the user while the bicycle is in motion.

In order to achieve the above and other aspects of the present invention, an angle adjuster for a bicycle seat that is configured to be installed between a frame of a bicycle and a seat and includes: a frame connector configured to be connected with the frame; a seat connector configured to support the seat, rotatably connected to the upper end of the frame connector, and having a nose at bottom facing the frame connector; an angle adjusting assembly disposed between the frame connector and the seat connector, and having a plurality of locking steps where the nose is configured to be selectively engaged to control rotational angle of the seat connector; an operating lever configured to be mounted on the frame to operate the angle adjusting assembly; and a wire connecting the angle adjusting assembly with the operating lever and reciprocating the angle adjusting assembly, when the operating lever is operated.

The locking steps of the angle adjusting assembly are formed in step shapes having inclined stepped portions, and a nose of the seat connector is configured to be selectively engaged with the locking steps in accordance with reciprocation of the angle adjusting assembly, such that rotational angle of the seat connector is controlled.

Further, the angle adjuster for a bicycle seat further includes an elastic member disposed between the frame connector and the angle adjusting assembly and providing elastic force such that the angle adjusting assembly is engaged with any one of the locking steps.

Further, the angle adjuster for a bicycle seat further includes: a seat support shaft configured to support the seat, reciprocating in the seat connector, and having a plurality of locking grooves formed in the longitudinal direction of the shaft; a support spring configured to elastically support the seat support shaft such that the seat is spaced apart from the seat connector; a locking member configured to be selectively locked in the locking grooves to control height of the seat support shaft; a sub-operating lever configured to be mounted on the frame operating the locking member; and a sub-wire connecting the locking member with the sub-operating lever and operating the locking member, when the sub-operating lever is operated.

Further, the angle adjuster for a bicycle seat further includes a sub-elastic member disposed between the seat connector and the locking member to provide elastic force such that the locking member is locked in any one of the locking grooves.

Further, the angle adjuster for a bicycle seat further includes: a plurality of locking grooves formed in the longitudinal direction of the frame connector and configured to be received in the frame; a support spring configured to elastically support the frame connector such that the frame connector is spaced apart from the frame; a locking member configured to be selectively locked in the locking grooves to control height of the frame connector with respect to the frame; a sub-operating lever configured to be mounted on the frame operating the locking member; and a sub-wire connecting the locking member with the sub-operating lever and operating the locking member, when the sub-operating lever is operated.

Further, the angle adjuster for a bicycle seat further includes a sub-elastic member configured to be disposed between the frame and the locking member to provide elastic force such that the locking member is locked in any one of the locking grooves.

As described above, an angle adjuster for a bicycle seat according to an embodiment of the present invention makes it possible to adjust angle of the seat to fit the body shapes of users such that they may ride the bicycle in a comfortable position. Further, it is possible to prevent an accident by appropriately adjusting angle of the seat such that the user's body is not inclined in one direction, when going up or coming down a slope. In particular, it is possible for a user to freely adjust the angle and height of the seat by operating the operating lever while the bicycle is in motion, thereby providing users with convenience.

The foregoing and other aspects will become apparent from the following detailed description when considered in conjunction with the accompanying drawing figures.

DETAILED DESCRIPTION OF THE INVENTION

Figure 1:
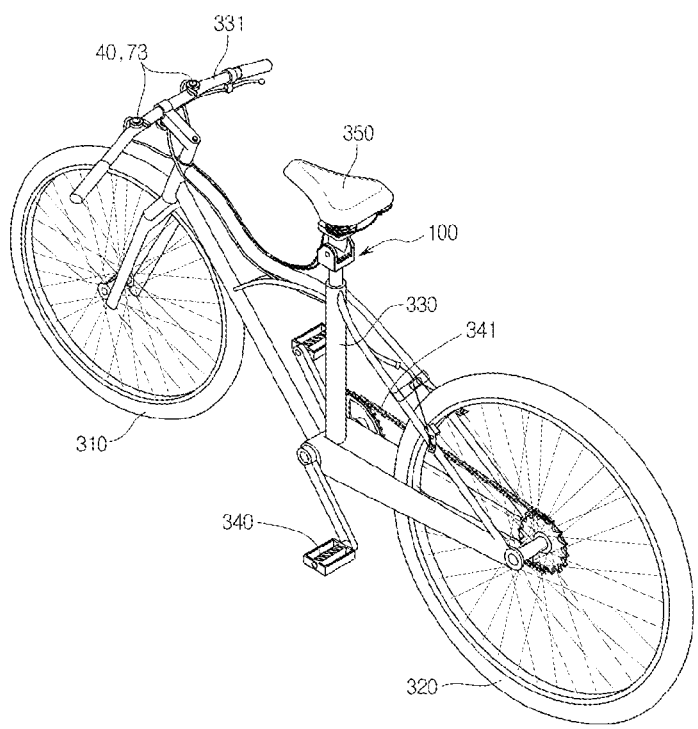
FIG. 1 is a view showing a bicycle equipped with an angle adjuster for a bicycle seat according to a first embodiment of the present invention.

Reference will now be made in detail to exemplary embodiments of the present invention, examples of which are illustrated in the accompanying drawings, wherein like reference numerals refer to the like elements throughout. The exemplary embodiments are described below to explain the present invention by referring to the figures. As used in the description of this application, the terms "a", "an" and "the" may refer to one or more than one of an element (e.g., item or act). Similarly, a particular quantity of an element may be described or shown while the actual quantity of the element may differ. The terms "and" and "or" may be used in the conjunctive or disjunctive sense and will generally be understood to be equivalent to "and/or". Elements from an embodiment may be combined with elements of another. No element used in the description of this application should be construed as critical or essential to the invention unless explicitly described as such. Further, when an element is described as "connected," "coupled," or otherwise linked to another element, it may be directly linked to the other element, or intervening elements may be present.

Figure 2:
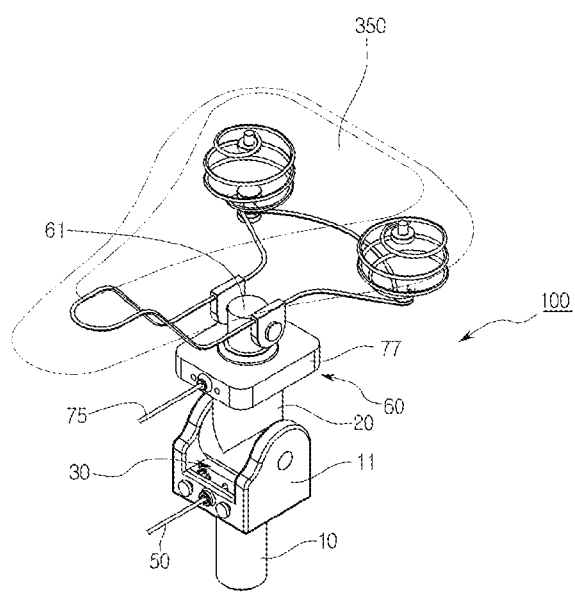
FIG. 2 is a perspective view showing the structure of the angle adjuster for a bicycle seat according to the first embodiment of the present invention.
Figure 3:
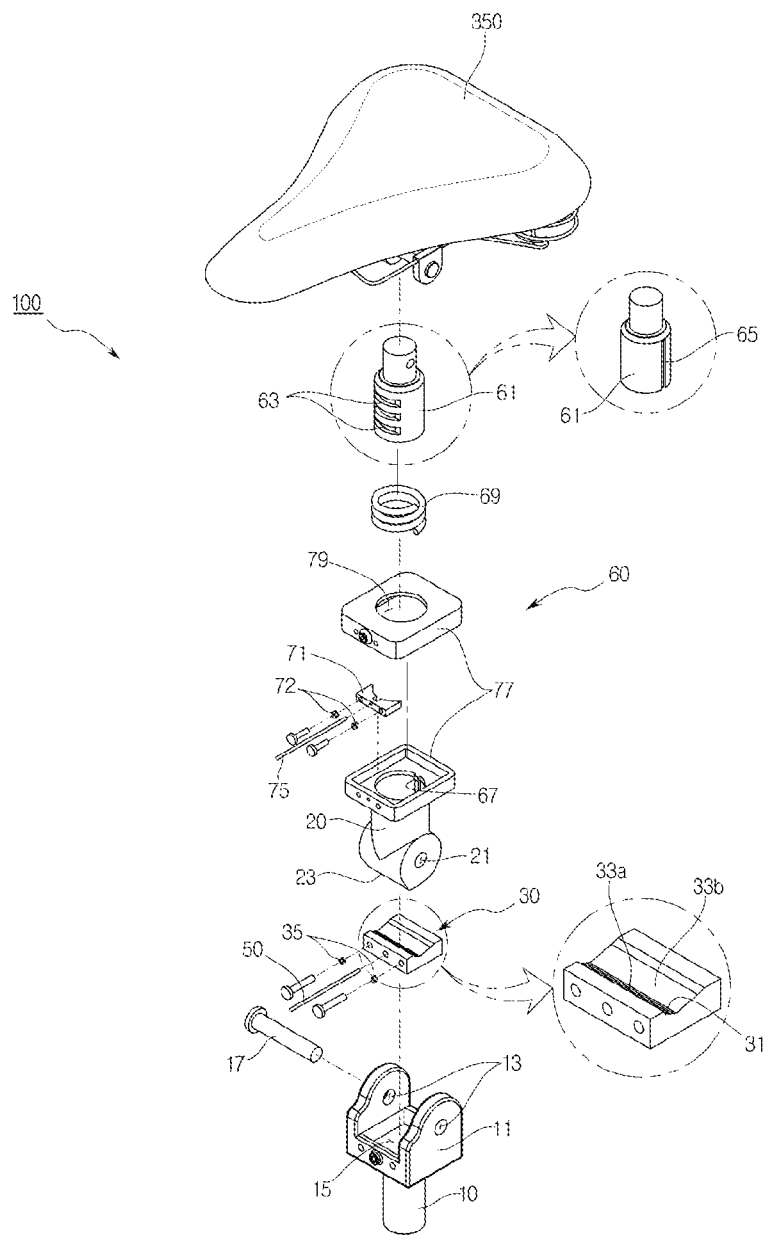
FIG. 3 is an exploded perspective view showing the structure of the angle adjuster for a bicycle seat according to the first embodiment of the present invention.

FIG. 1 is a view showing a bicycle equipped with an angle adjuster for a bicycle seat according to a first embodiment of the present invention, FIG. 2 is a perspective view showing the structure of the angle adjuster for a bicycle seat according to the first embodiment of the present invention, and FIG. 3 is an exploded perspective view showing the structure of the angle adjuster for a bicycle seat according to the first embodiment of the present invention.

Referring to FIGS. 1 to 3, a bicycle equipped with an angle adjuster for a bicycle seat according to a first embodiment of the present invention may include: a front wheel 310 and a rear wheel 320 that rotate on the ground to move the bicycle; a frame 330 that has handlebars steering the front wheel 310 at the front upper portion and supporting the front wheel 310 and the rear wheel 320 to be rotatable; pedals 340 that are linked with the rear wheel 320 by a chain 341 to rotate the rear wheel 320; a seat 350 that is mounted at the rear upper portion of the frame 330 for a user to ride; and an angle adjuster for a seat 100 that is disposed between the frame 330 and the seat 350 and makes it possible to adjust angle of the seat 350 by an operating lever 60 mounted on the frame 330.

In this configuration, the angle adjuster for a bicycle seat 100 according to the first embodiment may include: a frame connector 10 connected to the frame 350; a seat connector 20 connected to the upper end of the frame connector 10 to support the seat 350; an angle adjusting assembly 30 controlling the rotational angle of the seat connector 20; the operating lever 40 operating the angel adjusting assembly 30; and a wire 50 connecting the angle adjusting assembly 30 with the operating lever.

The frame connector 10 may be connected to the frame 330 of the bicycle which is disposed under the seat 350 and may have a hinge structure together with the seat connector such that the seat connector 20 may be rotatably connected to the upper end.

That is, a housing 11 covering the lower end of the seat connector 20 may be disposed on the upper end of the frame connector 10 and a hinge shaft 17 may be fitted in a first through-hole 13 at both sides of the housing 11, such that the seat connector 20 may be fitted on the hinge shaft 17.

Further, a receiving portion 15 that may receive the angle adjusting assembly 30 may be formed inside the housing 11.

The seat connector 20 may support the seat 350 under the seat 350, may be rotatably connected to the upper end of the frame connector 10, and may have a nose 23 at the lower end facing the frame connector 10.

That is, the seat connector 20 may have a second through-hole 21, which is formed at the lower portion and fitted on the hinge shaft 17, to be rotatably combined with the housing 11 of the frame connector 10, and the nose 23 may contact the angle adjusting assembly 30, at the bottom.

The angle adjusting assembly 30 may be received in the receiving portion 15 of the frame connector 10 while being in contact with the seat connector 20. A plurality of locking steps 31 selectively engaged with the nose 23 of the seat connector 20 may be formed on the top of the angle adjusting assembly to control the rotational angle of the seat connector 20.

In this configuration, the locking steps 31 may be formed in a step shape having inclination, such that the nose 23 of the seat connector 20 may be sequentially engaged. Further, a first stopper 33a may be formed at the start of the locking steps 31 and a second stopper 33b may be formed at the end of the locking steps 31 in the angle adjusting assembly 30 to support the nose 23 such that the seat connector 20 may not rotate above predetermined angle.

According to the configuration described above, the angle adjusting assembly 30 may be connected with the operating lever 40 mounted on the frame 330 of the bicycle by the wire 50 and reciprocates, when the operating lever may be operated, in which the nose 23 of the seat connector 20 may be selectively engaged with the locking steps 31, such that the rotational angle of the seat connector 20 is controlled.

Further, an elastic member 35 may be disposed between the receiving portion 15 of the frame connector 10 and the angle adjusting assembly 30 to provide elastic force such that the nose 23 of the seat connector 20 may be engaged with any one of the locking steps 31.

The operating lever 40 may be mounted on the frame 330 of the bicycle to operate the angle adjusting assembly 30. That is, the operating lever 40 may be operated to reciprocate the angle adjusting assembly 30 such that the nose 23 of the seat connector 20 may be selectively engaged with the locking steps 31. In this configuration, it may be preferable that the operation lever 40 may be installed on the handlebars 332 of the frame 330 of the bicycle to provide the user with operational convenience.

The wire 50 may connect the angle adjusting assembly 30 with the operating lever 40 and may reciprocate the angle adjusting assembly in the receiving portion 15 of the frame connector 10, when a user operates the operating lever 40.

Meanwhile, the angle adjuster for a bicycle seat according to the first embodiment of the present invention may further include a height adjusting assembly 80 that may make it possible to adjust height of the seat 350.

The height adjusting assembly 60 may include a seat support shaft 61 that may support the seat 350 of the bicycle, may reciprocate in the seat connector 20, and may have a plurality of locking grooves 63 formed in the longitudinal direction of the shaft, a support spring 69 that may elastically support the seat support shaft 61 such that the seat 350 of the bicycle may be spaced apart from the seat connector 20, a locking member 71 that may be selectively locked in the locking grooves 63 of the seat support shaft 61 to control height of the seat support shaft 61, a sub-operating lever 73 that may be mounted on the frame 330 of the bicycle and operate the locking member 71, and a sub-wire 75 that may connect the locking member 71 with the sub-operating lever 73 and may operate the locking member 71, when the sub-operating lever 73 is operated.

A case 97 that may receive the locking member 91 may be disposed at the upper end of the seat connector 20 and the seat support shaft 81 may protrude through a through-hole 99 formed through the case 97.

Further, a guide rail 67 may be vertically formed inside the seat connector 20 where the seat support shaft 61 may be received and a rail groove 65 corresponding to the guide rail 67 may also be formed on the seat support shaft 61, such that they may be combined. That is, the seat support shaft 61 may ascend/descend in a predetermined direction along the guide rail 67 of the seat connector 20 which may be fitted in the rail groove 65.

According to the configuration described above, the support spring 69 received in the seat connector 20 may elastically support the seat support shaft 61 supporting the seat 350 and the locking member 71 in the case 77 may be locked in the locking groove 63 of the seat support shaft 61, such that the height of the seat support shaft 61 is fixed. In this structure, the height of the seat support shaft 61 may be adjusted by operating the sub-operating lever 73 such that the locking member 71 connected with the sub-wire 75 may move forward or backward and the locking member 71 may be selectively locked in the locking groove 63 of the seat support shaft 61.

Further, a sub-elastic member 72 may be disposed between the locking member 91 and the case 77 of the seat connector 20 to provide elastic force such that the locking member 71 may be locked in any one of the locking grooves 63 of the seat support shaft 61.

The operation of the angle adjuster for a bicycle seat having the above configuration according to the first embodiment of the present invention is described hereafter.

Figure 4:
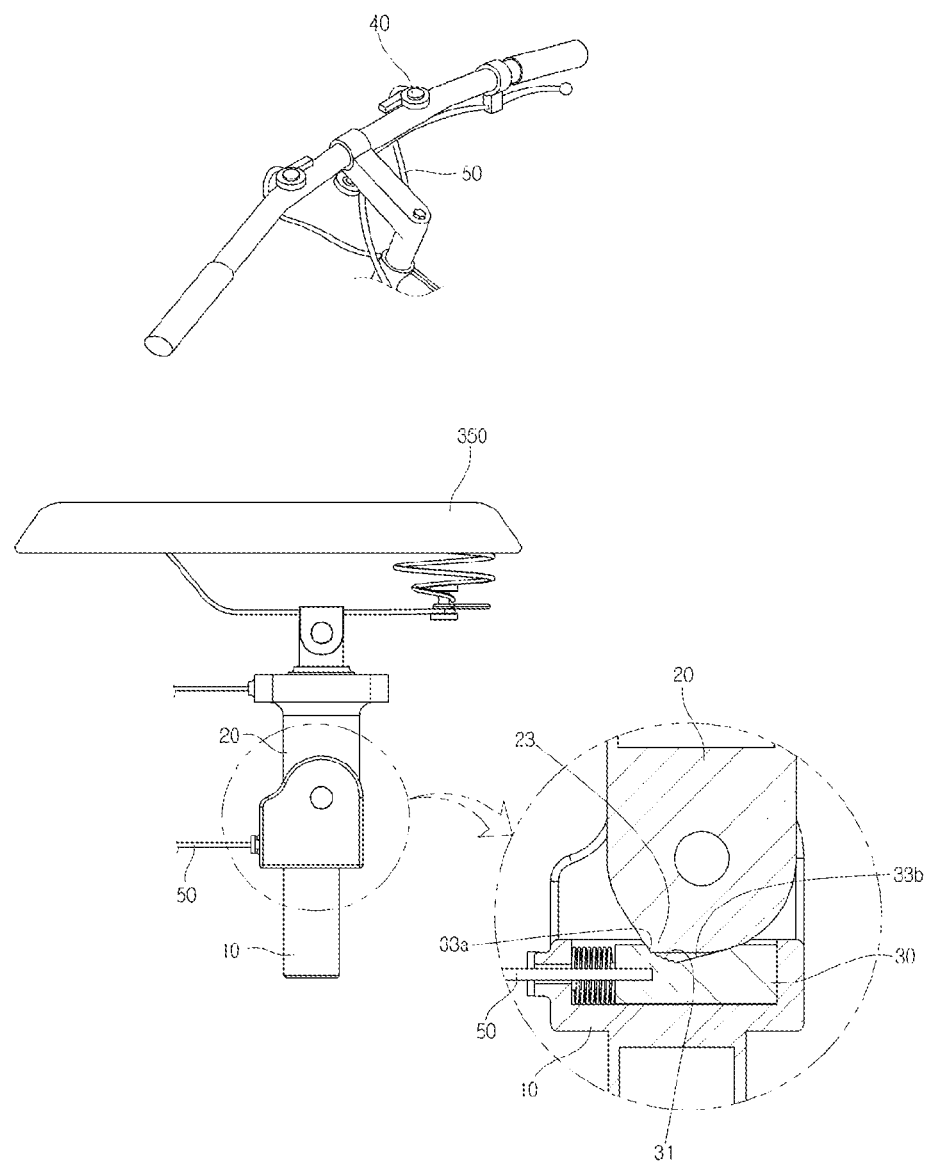
FIGS. 4 to 6 are views illustrating the angle adjustment operation of the angle adjuster for a bicycle seat according to the first embodiment of the present invention.
Figure 5:
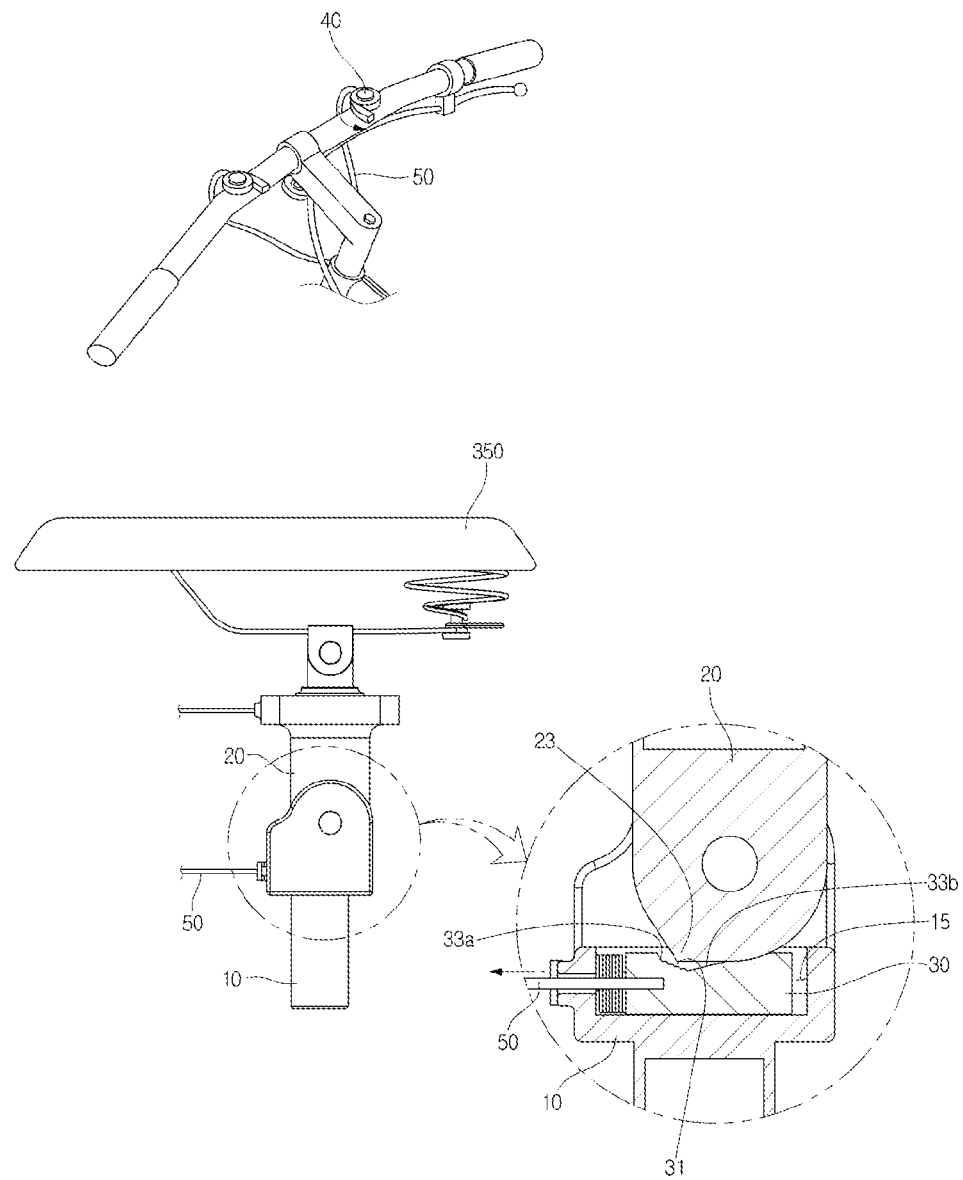
Figure 6:
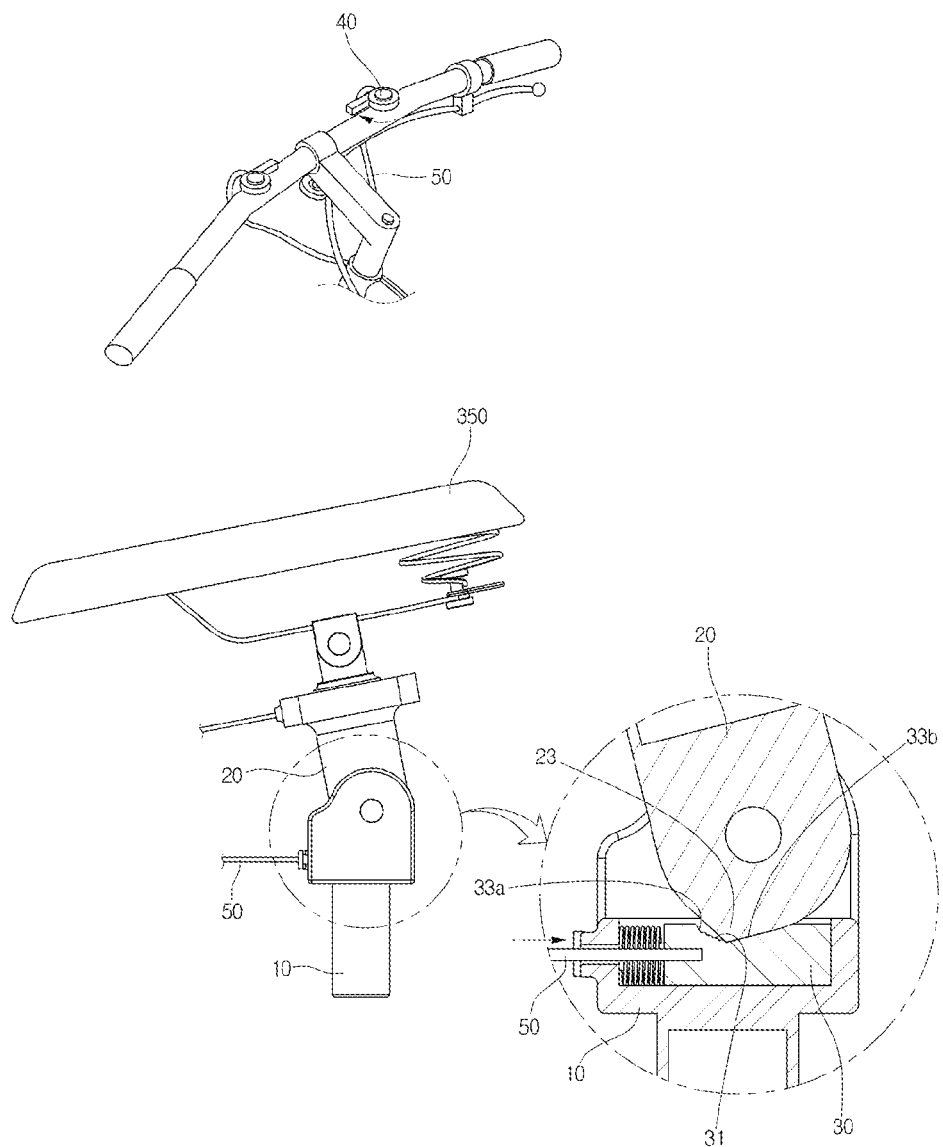

FIGS. 4 to 6 are views illustrating the angle adjustment operation of the angle adjuster for a bicycle seat according to the first embodiment of the present invention.

As shown in FIG. 4, the nose 23 of the seat connector 20 may be engaged with the uppermost locking step 31 in the locking steps 31 of the angle adjusting assembly, when the operating lever 40 is not operated by a user.

In this position, the nose 23 may be supported by the first stopper 33a and the bottom of the seat connector 20 may be supported by the second stopper 33b such that the seat connector 20 does not rotate.

As shown in FIG. 5, as a user may operate the operating lever 40 to adjust the angle of the seat 350, the wire 50 connected with the operating lever 40 may be pulled and the angle adjusting assembly 40 may be moved backward in the receiving portion 15, such that the locking grooves 31 of the angle adjusting assembly 30 and the nose 23 of the seat connector 20 may be disengaged.

In this position, the user may adjust the angle of the seat 350 and may also adjust the angle even on the seat 350, and thus, it is possible to adjust the angle of the seat 350 while the bicycle is in motion.

Next, as shown in FIG. 6, the angle of the seat connector 20 may be fixed with respect to the frame connector 10 by operating the operating lever 40 in the opposite way, after the angle adjustment of the seat 350 may be finished, in which the wire 50 may be pushed and the angle adjusting assembly 30 connected to the wire 50 may return forward such that the nose 23 of the seat connector 20 of which the angle has been adjusted may be engaged with any one of the locking steps 31 of the angle adjusting assembly 30.

In this position, the nose may be supported by the locking step 31 and the bottom of the seat connector 20 may be supported by the second stopper 33b such that the seat connector 20 may not rotate.

Figure 7:
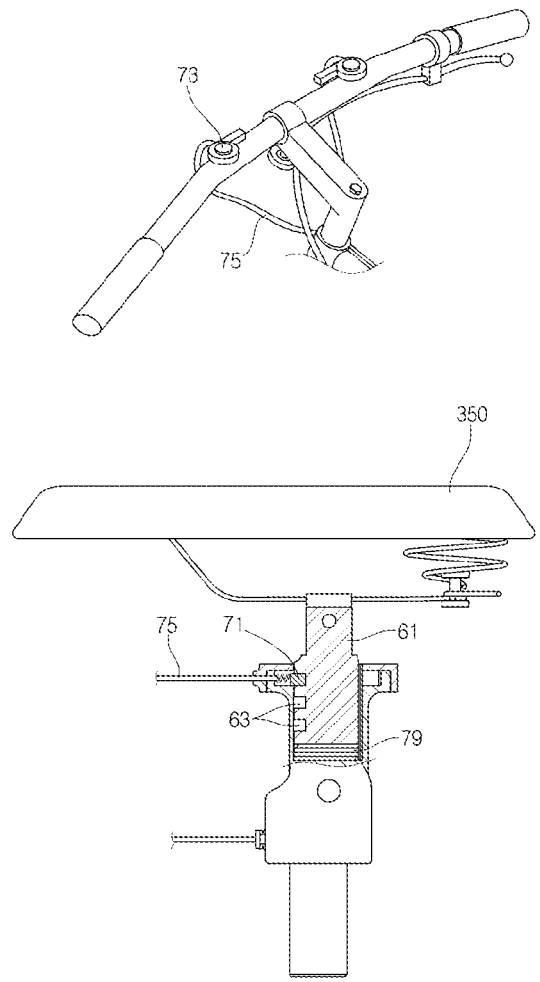
FIGS. 7 to 9 are views the height adjustment operation of the angle adjuster for a bicycle seat according to the first embodiment of the present invention.
Figure 8:
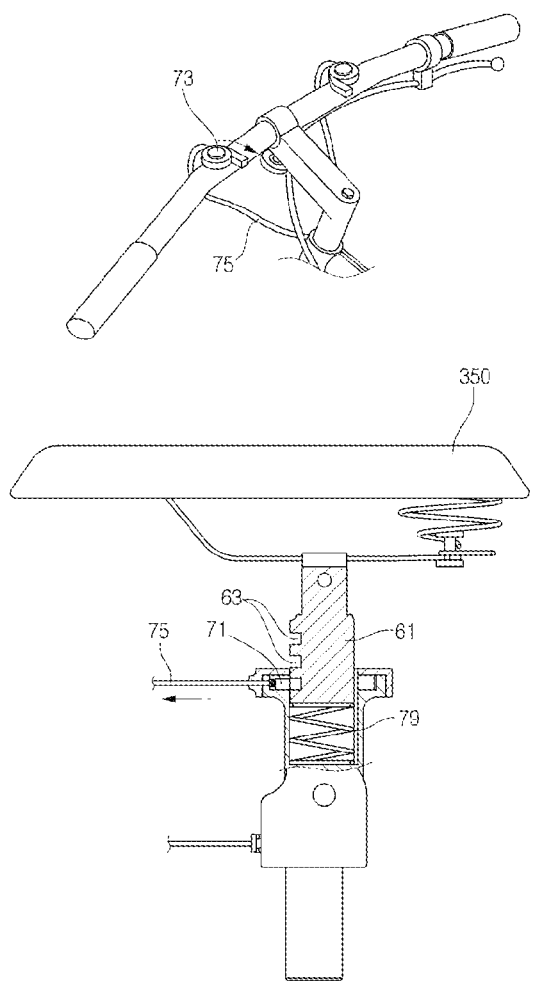
Figure 9:
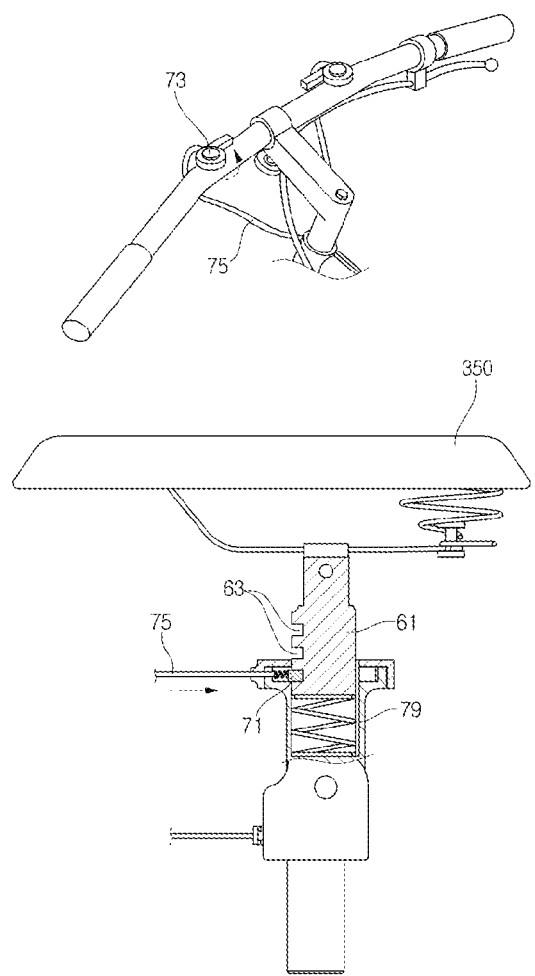

FIGS. 7 to 9 are views the height adjustment operation of the angle adjuster for a bicycle seat according to the first embodiment of the present invention.

As shown in FIG. 7, the locking member 71 may be locked in the uppermost locking groove 63 in the locking grooves 63 of the seat support shaft 61 and may fix the height of the seat 350, when the sub-operating lever 73 is not operated by the user.

As shown in FIG. 8, as the user operates the sub-operating lever 73 to adjust the height of the seat 350, the sub-wire 75 connected with the sub-operating lever 73 may be pulled and the locking member 71 may be separated from the locking groove 63 of the seat support shaft 61 supporting the seat 350 and the support spring 69 may lift the seat support shaft 61.

In this position, the user may adjust the height of the seat 350 and may also adjust the height even on the seat 350, and thus, it is possible to adjust the height of the seat 350 while the bicycle is in motion.

Next, as shown in FIG. 9, the height of the seat 350 may be fixed by operating the sub-operating lever 73 in the opposite way, after the height adjustment of the seat 350 may be finished, in which the sub-wire 75 may be pushed and the locking member 71 connected to the sub-wire 75 is locked in any one of the locking grooves 63 of the seat support shaft 61.

The configuration and operation of an angle adjuster for a bicycle seat according to a second embodiment of the present invention is described hereafter.

Figure 10:
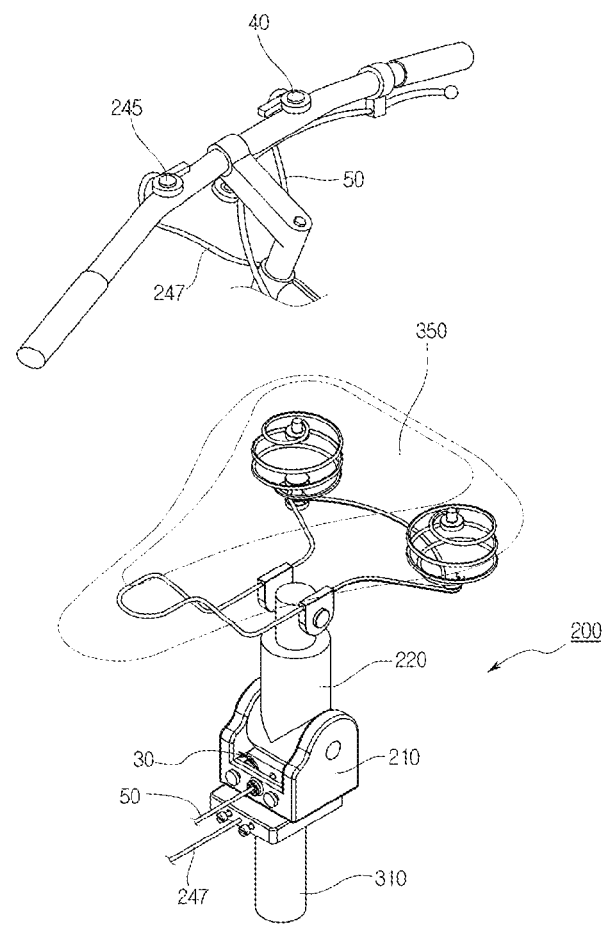
FIG. 10 is a perspective view illustrating the configuration of an angle adjuster for a bicycle seat according to a second embodiment of the present invention.
Figure 11:
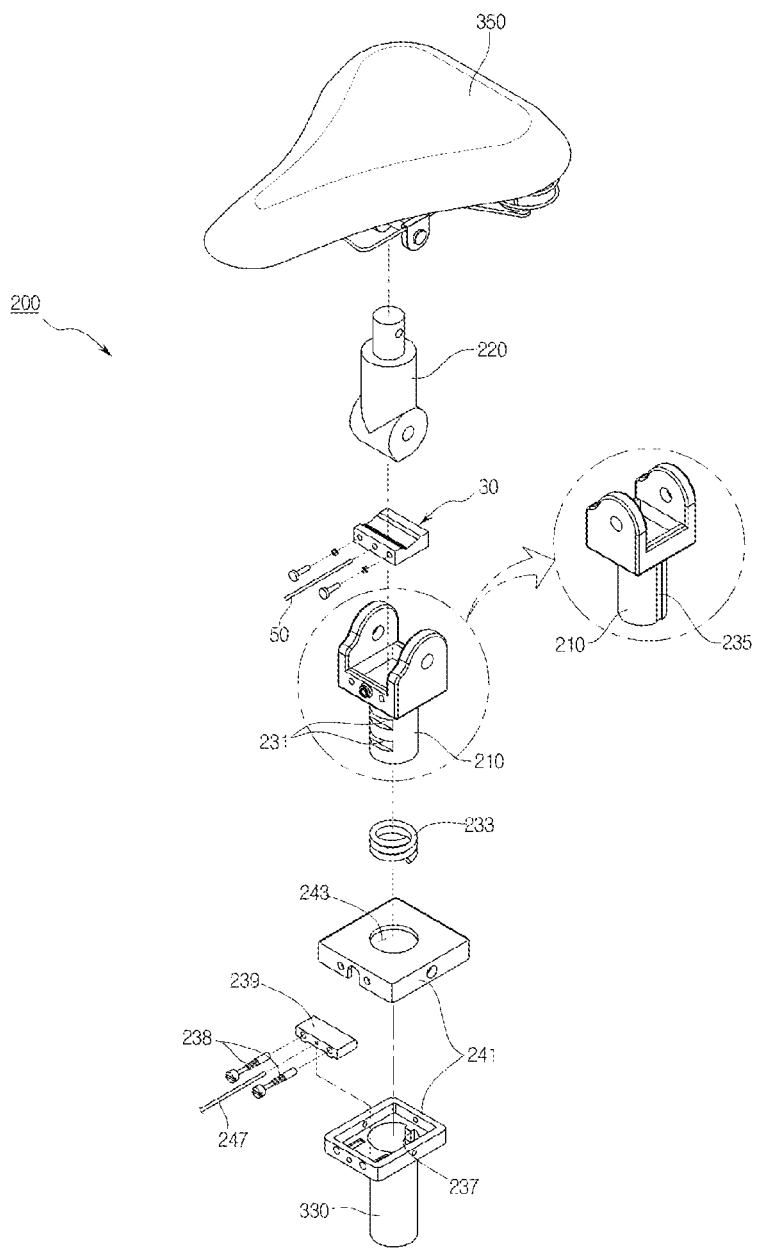
FIG. 11 is an exploded perspective view illustrating the configuration of the angle adjuster for a bicycle seat according to the second embodiment of the present invention.

FIG. 10 is a perspective view illustrating the configuration of an angle adjuster for a bicycle seat according to a second embodiment of the present invention. FIG. 11 is an exploded perspective view illustrating the configuration of the angle adjuster for a bicycle seat according to the second embodiment of the present invention.

Referring to FIGS. 10 and 11, an angle adjuster for a bicycle seat 200 according to the second embodiment of the present invention may include a frame connector 210, a seat connector 220, an angle adjusting assembly 30, an operating lever 40, and a wire 50, which may have the same configuration and operation as in the angle adjuster for a bicycle seat 100 according to the first embodiment of the present invention, and a height adjusting assembly 240 may be mounted on the frame 330 of the bicycle and the frame connector 210.

The lower end portion of the body of the frame connector 210 may be received in the frame 330 of the bicycle 330, elastically supported by a support spring 233 disposed in the frame 330, and reciprocated by the height adjusting assembly 230, thereby adjusting the height.

The seat connector 220 may be disposed rotatably on the frame connector 210 while supporting the seat 350, and the rotational angle of adjusted by the operation of the angle adjusting assembly 30. That is, as a user may operate the operating lever 40 and the wire 50 may be pulled, the angle adjusting assembly 30 connected to the wire 50 may be operated, such that the rotational angle of the seat connector 220 may be adjusted.

The height adjusting assembly 230 may include a plurality of locking grooves 231 formed in the longitudinal direction of the frame connector 210 and received in the frame 330 of the bicycle, a support spring 233 elastically supporting the frame connector 210 such that the frame connector 210 is spaced apart from the frame 330 of the bicycle, a locking member 239 selectively locked in the locking grooves 231 of the frame 330 to control the height of the frame connector 210 with respect to the frame 330 of the bicycle, a sub-operating lever 245 mounted on the frame 330 of the bicycle to operate the locking member 239, and a sub-wire 237 connecting the locking member 239 with the sub-operating lever 245 and operating the locking member 239, when the sub-operating lever 245 is operated. In this configuration, a case 241 that receives the locking member 239 is disposed at the upper end of the frame 330 and the frame connector 239 may be inserted through a through-hole 234 formed through the case 241.

In this configuration, a guide rail 237 may be vertically formed inside the frame 330 where the frame connector 210 may be received and a rail groove 235 corresponding to the guide rail 237 may also be formed on the frame connector 210, such that they are combined. That is, the frame connector 210 may ascend/descend in a predetermined direction along the guide rail 237 of the frame 330 which is fitted in the rail groove 235.

According to the configuration described above, since the support spring 233 may support the frame connector 210 in the frame 330 of the bicycle where the frame connector 210 may be connected and the locking member 239 disposed in the case 241 may be locked in the locking groove 231 of the frame connector 210, the height of the frame connector 210 may be fixed. In this configuration, it may be possible to adjust the height of the frame connector 210 with respect to the frame 330 of the bicycle by operating the sub-operating lever 245, in which the locking groove 239 connected to the sub-wire 247 may move forward or backward such that the locking member 239 may be selectively locked in the locking grooves 231 of the frame connector 210.

Further, a sub-elastic member 238 may be disposed between the locking member 239 and the case 241 of the frame connector 210 to provide elastic force such that the locking member 239 may be locked in any one of the locking grooves 231 of the frame connector 210.

As described above, an angle adjuster for a bicycle seat according to the present invention makes it possible to adjust angle of the seat to fit the body shapes of users such that they may ride the bicycle in a comfortable position. Further, it is possible to prevent an accident by appropriately adjusting angle of the seat such that the user's body does not inclined in one direction, when going up or coming down a slope. In particular, it is possible for the users to freely adjust the angle and height of the seat by operating the operating lever while the bicycle is in motion, thereby providing the users with convenience.

Although embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. An angle adjuster for a bicycle seat that is configured to be installed between a frame of a bicycle and a seat, the angle adjuster comprising:
   a frame connector configured to be connected with the frame;
   a seat connector configured to support the seat, rotatably connected to the upper end of the frame connector, and having a nose at bottom facing the frame connector;
   an angle adjusting assembly disposed between the frame connector and the seat connector, and having a plurality of locking steps where the nose is configured to be selectively engaged to control rotational angle of the seat connector;
   an operating lever configured to be mounted on the frame to operate the angle adjusting assembly;
   a wire connecting the angle adjusting assembly with the operating lever and reciprocating the angle adjusting assembly, when the operating lever is operated;
   an elastic member disposed between the frame connector and the angle adjusting assembly and providing elastic force such that the angle adjusting assembly is engaged with any one of the locking steps;
   a seat support shaft configured to support the seat, reciprocating in the seat connector, and having a plurality of locking grooves formed in the longitudinal direction of the shaft;
   a support spring configured to elastically support the seat support shaft such that the seat is spaced apart from the seat connector;
   a locking member configured to be selectively locked in the locking grooves to control height of the seat support shaft;
   a sub-operating lever configured to be mounted on the frame operating the locking member; and
   a sub-wire connecting the locking member with the sub-operating lever and operating the locking member, when the sub-operating lever is operated.

2. The angle adjuster for a bicycle seat according to claim 1, wherein the locking steps of the angle adjusting assembly are formed in step shapes having inclined stepped portions, and a nose of the seat connector is configured to be selectively engaged with the locking steps in accordance with reciprocation of the angle adjusting assembly, such that rotational angle of the seat connector is controlled.

3. The angle adjuster for a bicycle seat according to claim 1, further comprising a sub-elastic member disposed between the seat connector and the locking member to provide elastic force such that the locking member is locked in any one of the locking grooves.

4. An angle adjuster for a bicycle seat that is configured to be installed between a frame of a bicycle and a seat, the angle adjuster comprising:
- a frame connector configured to be connected with the frame;
- a seat connector configured to support the seat, rotatably connected to the upper end of the frame connector, and having a nose at bottom facing the frame connector;
- an angle adjusting assembly disposed between the frame connector and the seat connector, and having a plurality of locking steps where the nose is configured to be selectively engaged to control rotational angle of the seat connector;
- an operating lever configured to be mounted on the frame to operate the angle adjusting assembly;
- a wire connecting the angle adjusting assembly with the operating lever and reciprocating the angle adjusting assembly, when the operating lever is operated;
- an elastic member disposed between the frame connector and the angle adjusting assembly and providing elastic force such that the angle adjusting assembly is engaged with any one of the locking steps;
- a plurality of locking grooves formed in the longitudinal direction of the frame connector and configured to be received in the frame;
- a support spring configured to elastically support the frame connector such that the frame connector is spaced apart from the frame;
- a locking member configured to be selectively locked in the locking grooves to control height of the frame connector with respect to the frame;
- a sub-operating lever configured to be mounted on the frame operating the locking member; and
- a sub-wire connecting the locking member with the sub-operating lever and operating the locking member, when the sub-operating lever is operated.

5. The angle adjuster for a bicycle seat according to claim 4, further comprising a sub-elastic member configured to be disposed between the frame and the locking member to provide elastic force such that the locking member is locked in any one of the locking grooves.

* * * * *